(12) United States Patent
Laugesen

(10) Patent No.: US 8,622,982 B2
(45) Date of Patent: Jan. 7, 2014

(54) DISPOSABLE ABSORPTIVE ARTICLE

(75) Inventor: Martin Sibast Laugesen, Copenhagen (DK)

(73) Assignee: MSL Polymer Business, Copenhagen O (DK)

( * ) Notice: Subject to any disclaimer, the term of this patent is extended or adjusted under 35 U.S.C. 154(b) by 189 days.

(21) Appl. No.: 10/499,149

(22) PCT Filed: Dec. 18, 2002

(86) PCT No.: PCT/DK02/00872
§ 371 (c)(1), (2), (4) Date: Apr. 19, 2005

(87) PCT Pub. No.: WO03/051170
PCT Pub. Date: Jun. 26, 2003

(65) Prior Publication Data
US 2006/0257623 A1 Nov. 16, 2006

(30) Foreign Application Priority Data
Dec. 19, 2001 (DK) .................................. 2001 01918

(51) Int. Cl.
*A61M 1/00* (2006.01)
(52) U.S. Cl.
USPC ............................ 604/317; 604/358; 604/367
(58) Field of Classification Search
USPC ........ 604/359–360, 365–369, 378, 385.01, 3, 604/374–375, 317
See application file for complete search history.

(56) References Cited

U.S. PATENT DOCUMENTS

| 3,591,524 | A | * | 7/1971 | Eriksen | 502/1 |
| 4,185,754 | A | | 1/1980 | Julius | |
| 4,595,441 | A | | 6/1986 | Mitrani et al. | |
| 4,673,403 | A | | 6/1987 | Lassen et al. | |
| 4,676,785 | A | | 6/1987 | Battista | |
| 5,000,341 | A | * | 3/1991 | Shirota | 220/552 |
| 5,405,342 | A | * | 4/1995 | Roessler et al. | 604/364 |
| 5,647,863 | A | | 7/1997 | Hammons et al. | |
| 5,716,840 | A | * | 2/1998 | Kahler et al. | 435/264 |
| 6,121,039 | A | * | 9/2000 | Lasky et al. | 435/262.5 |
| 6,365,214 | B1 | * | 4/2002 | Kirk | 426/330.6 |
| 6,394,313 | B1 | * | 5/2002 | Wesley | 222/131 |

FOREIGN PATENT DOCUMENTS

| DE | 101 08 130 C | 7/2002 |
| GB | 2 151 912 A | 7/1985 |
| GB | 2 319 188 | 5/1998 |
| GB | 2 368 261 A | 5/2002 |
| WO | WO 98 58733 A | 12/1998 |
| WO | WO 00 37002 A | 8/2000 |

* cited by examiner

Primary Examiner — Michele M Kidwell
(74) Attorney, Agent, or Firm — Iver P. Cooper

(57) ABSTRACT

The present invention concerns a disposable article for absorbing a liquid, wherein the article has a substantially non-liquid permeable layer forming an outer packaging surface of the article, and an absorptive material, wherein the outer packaging surface surrounds at least one side of the absorptive material, and wherein said outer packaging surface further includes an opening, through which liquid can pass into the absorptive material. The invention also relates to a method of producing an article and the use of said article in for example the plumbing business, as a drip absorbent, as a residual liquid absorbent, and as a condensate absorbent.

37 Claims, 2 Drawing Sheets

DISPOSABLE ABSORPTIVE ARTICLE

TECHNICAL FIELD OF THE INVENTION

Figure 1:
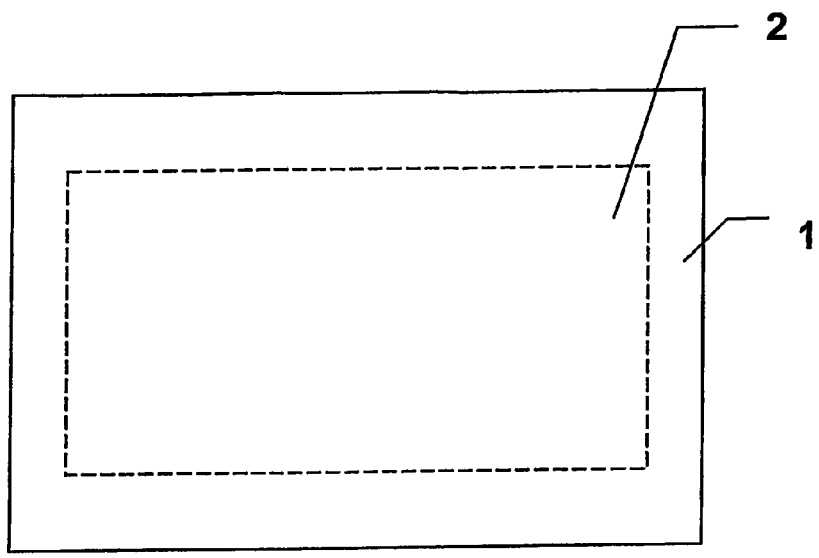

The present invention discloses a disposable article made from absorptive material surrounded by a non-absorptive material for the use in industries in need of an absorbent for drips, residual liquid or condensates. The invention also describes a method of producing such an article, and the use of the method and article.

BACKGROUND OF THE INVENTION

It is essential that people in environments where there are a potential risk of leaks or spills of liquids (toxic add non-toxic) are provided with means for cleaning up and preventing leaks or spills. A number of products have been developed for absorbing liquids from leaks and spills. Usually each product is directed to a specific type of problem. For example, leaks, splashes and drips of a slippery liquid over a walkway may be addressed by a "walk on" mat absorbing the liquid and which has an upper surface resistant to the wear of foot traffic. The products are also used in "non-traffic" areas as absorbent pads. Puddles of liquid are often cleaned up by throwing absorbent response pads or pillows on the puddle. The outward flow of a leak or spill is often contained by placing a sock around the outer edges of the liquid to soak up the liquid as it reaches the sock. Drips and sprays are absorbed from surfaces with wipes.

Disposable absorbent articles such as diapers, incontinence and hygiene articles and spill clean-up articles are well known in the art. Typically, disposable absorbent articles comprise a liquid pervious top-sheet, a liquid impervious back-sheet, and an absorbent core disposed between the liquid previous top-sheet and the back-sheet, and sometimes further means to keep the core fixed.

In U.S. Pat. No. 5,888,604 a multi-layered flexible sheet for absorbing liquids is disclosed. The sheet has the capacity to absorb liquids and a segmented flexible layer of woven or non-woven materials has the capacity to absorb liquids being tacked face-to-face to the non-segmented layer. The multi-layered sheet can be used unfolded as walk on mats, wipes, absorbent pads and response pads or folded as pillows or socks for absorbing liquids.

U.S. Pat. No. 6,284,362 describes absorbent compositions and methods for producing the absorbent compositions, absorbent products and their use. Examples of such products are absorbent sheets for pet urine, wrapping sheets for maintaining freshness, drip absorption sheets, rice plant raising sheets, sheets used for concrete production and water-running protection sheets for cables.

The present invention discloses a disposable article made from absorptive material surrounded by a non-absorptive material, wherein the embodiment of said article makes it suitable for industrial purposes and for applications in private homes. A significant advantage of the invention over the prior art resides in the easiness with which it can be transported, applied and disposed of, and how the present article is capable of handling a substantial over-dosage of liquid.

SUMMARY OF THE INVENTION

Accordingly, the present invention concerns a disposable article for absorbing a liquid, wherein the article has
 a substantially non-liquid permeable layer forming an outer packaging surface of the article, and
 an absorptive material, wherein
 the outer packaging surface surrounds at least one side of the absorptive material, and
 wherein said outer packaging surface further includes an opening, through which liquid can pass into the absorptive material.

The invention further discloses a method of producing such an article and the use of the method and the article.

DRAWINGS

FIG. 1: illustrates one possible embodiment of the article of the invention, (1) is the outer packaging surface, (2) the absorbent material.

Figure 2:
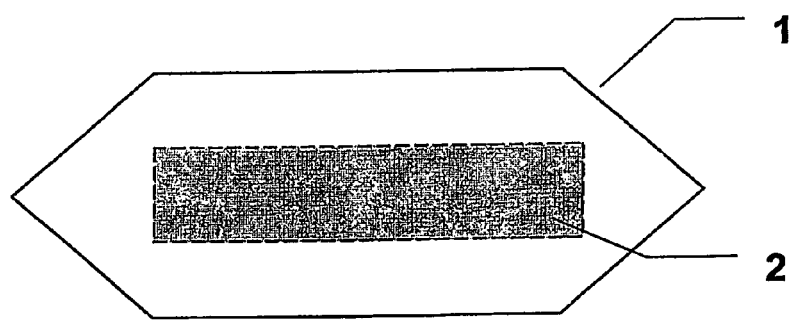

FIG. 2: is a cross-section of one embodiment of the present article as shown in FIG. 1 seen from the side, (1) is the outer packaging surface, (2) is the absorbent material.

Figure 3:
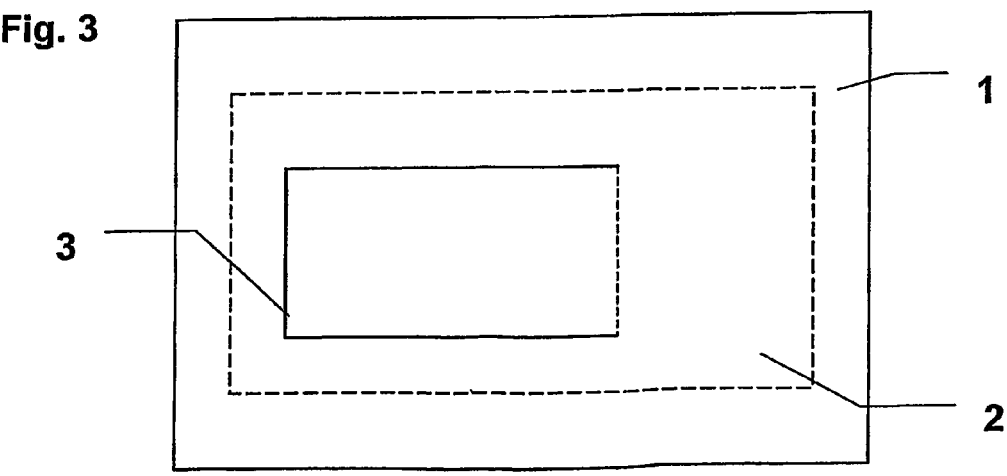

FIG. 3: illustrates one embodiment of the article wherein (1) is the outer packaging surface, (2) is the absorbent material, (3) is an opening in the outer packaging surface.

Figure 4:
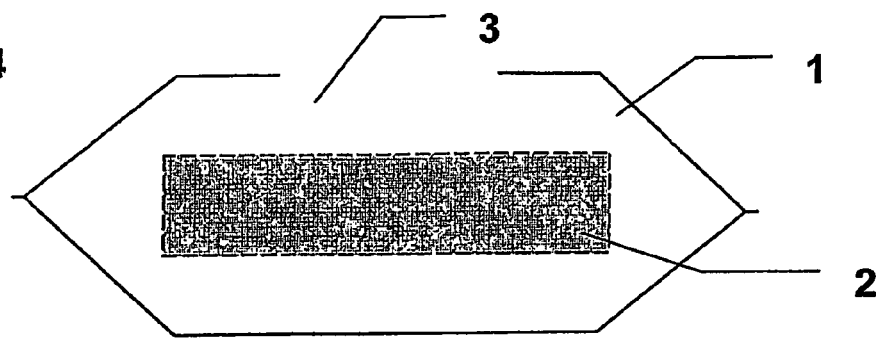

FIG. 4: is a cross-section of one embodiment of the present article at the initiation of absorption, wherein the absorbent material (2) is unexpanded, (1) is the outer packaging surface, (3) is an opening in the outer packaging surface.

Figure 5:
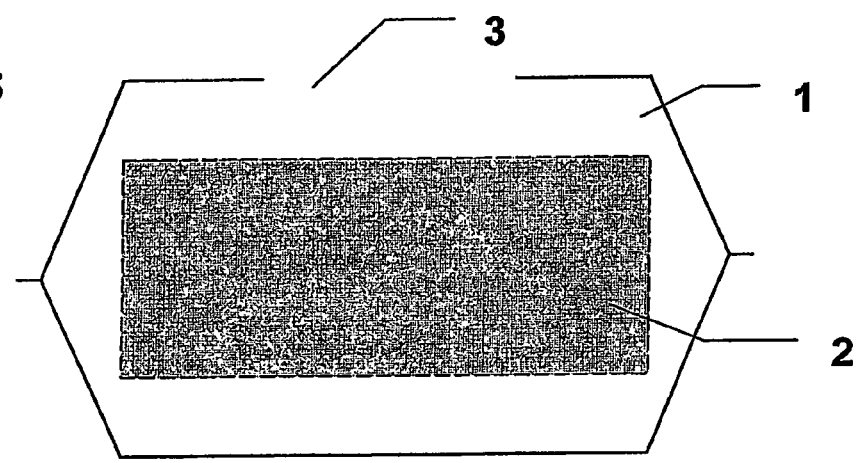

FIG. 5: is a cross-section of the embodiment of the present article shown in FIG. 4, wherein the absorbent material (2) is partially expanded, (1) is the outer packaging surface, (3) is an opening in the outer packaging surface.

Figure 6:
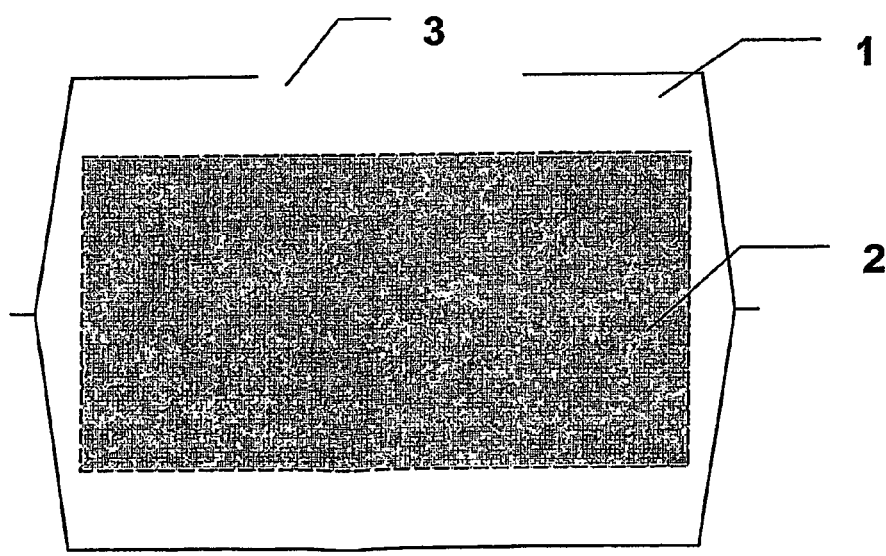

FIG. 6: is a cross-section of one embodiment of the present article, wherein the absorbent material (2) is fully expanded, (1) is the outer packaging surface, (3) is an opening in the outer packaging surface.

DETAILED DESCRIPTION OF THE INVENTION

It is the purpose of the present invention to provide a disposable article for absorbing a liquid, wherein the article has
 a substantially non-liquid permeable layer forming an outer packaging surface of the article, and
 an absorptive material, wherein
 the outer packaging surface surrounds at least one side of the absorptive material, and
 wherein said outer packaging surface further includes an opening, through which liquid can pass into the absorptive material.

Lid Opening

In one embodiment the article has an opening in the outer packaging surface which comprises a lid. The lid may be capable of being opened and closed repeatedly, or the lid may be disposed of once it has been opened. In case the lid is repeatedly opened and closed the mechanism by which the lid is attached to the outer packaging surface may be through the means of velcro-bands, glue, hinges, staples, tape, pressure sensitive adhesives or other suitable means. According to the invention the lid may be defined by perforating the outer material so as to obtain a demarcation of the lid area. Before using the present article the user may open the lid of the article by cutting along the demarcated line.

In another embodiment of the invention the lid may be an integral part of the outer packaging surface or it may be individually fastened to the outer packaging surface. In the latter case there are many means by which the lid may be fastened to the outer packaging surface. Examples of such means are staples, glue, tape, hinges, velcro-bands or pressure sensitive adhesive.

Shape/Size of Article

According to the invention the present article may be any size and shape suitable for the use intended. The present article may be produced in a variety of shapes and sizes. The number of embodiments of shapes and sizes of the present article is infinite. For example the article may be shaped as a triangle to fit corners, or the article may be star shaped to increase flexibility of the article, or the article may be heart shaped to fit around vertical pipes, for example. Further, the present article may be rectangular or squared. In one embodiment of the invention the size of the article has a circumference of between 20×20 cm and 100×100 cm, and a height between 0.2 mm and 20 mm.

In a preferred embodiment the article has a circumference or 40×40 cm and a height of 0.8 mm.

Super Absorptive Material

In one aspect of the invention the article comprises absorptive material capable of high absorption and retention of liquids. This is possible because the absorptive material comprises super absorptive particles or fibres.

Water-Based Liquid

The present article is in one embodiment capable of absorbing a water-based liquid. The following is a description of an absorptive material and article used for water-based liquids.

The present absorptive material comprises at least one layer made from a super absorptive material, such as super absorptive polymers or hydrogels. In a preferred embodiment the absorptive material of the article is made from at least one non-woven material. According to the invention non-woven materials in their simplest form consists of thermoplastic polymer fibres and additives, such as the synthetic superabsorbers polymethacrylicamide, polyacrylicacid, polymethacrylicacid, polyacrylicamide, polyvinylpyrrolidone or derivatives thereof. According to the invention such derivatives may in one embodiment be sodium, potassium, or aluminium salts. These materials are typically present in the form of particles or fibres to increase the absorption ability of non-woven materials. Further, the super absorbers may also be naturally-occurring materials, such as fluff pulp/cellulose fibres, carboxymethylcellulose, hydroxyethylcellulose, alginates, starches or derivatives thereof.

In one embodiment the absorbent material of the article comprises carboxymethylcellulose or hydroxyethylcellulose or alginate starches or derivatives thereof.

In another embodiment the absorptive material of the article comprises hydrophilic polyurethane foam.

In yet another embodiment the absorptive material of the article comprises polyacryllicacid or salts thereof, such as its sodium salts.

In one embodiment of the invention a mixture of naturally occurring and synthetic super absorbers are present in the non-woven material.

In a more preferred embodiment of the invention the absorptive material may be Vizorb 3907 from Buckeye non-wovens.

According to the present invention it is preferred that the super absorptive non-woven materials are produced by the air-laid method which is well known to the skilled person.

Alternatives to Non-Wovens

In a less preferred embodiment of the invention the absorptive material of the article comprises hydrophilic polyurethane foam. The foam may be in the form of sheets or as granulates. Other materials alternative to the non-woven may be selected among super absorptive particles or fibres in loose-weight, fluff pulp in loose weight, material from the textile industry, such as twist.

Absorption Speed

It is a purpose of the present invention to provide an article having a superior absorptive speed. In one aspect of the invention the initial absorption speed is determined by dropping a drop of the liquid used for the test onto the surface of the material where after the time of absorption of the drop into the material is measured. In one aspect of the invention the absorption speed of the absorptive material for 0.05-0.1 ml of water is less than 30 seconds. In another aspect the absorption speed is less than 20 seconds. In a further aspect the absorption speed is less than 10 seconds. In yet another aspect the absorption speed is less than 5 seconds. In a further aspect the absorption is less than 1 second.

Absorption Rate/Capacity

In the present context the term "absorption rate" and "absorption capacity" are used synonymously. According to the invention in one embodiment the absorptive rate of the material is determined as the absorptive rate/area for water calculated as the average of water absorption within 20 seconds after the absorptive material has been brought in contact with water. The absorptive rate is decreasing as the material is absorbing the water, however in a very important aspect of the present invention the initial absorptive rate is very fast and that is in fact one of the great advantages of the present invention. The absorption capacity may also be defined as the amount of liquid the material is capable of absorbing per gram of material (g/g). In one embodiment the absorptive rate is between 0.04 g/second/cm$^2$ and 0.30 g/second/cm$^2$ for water. In a preferred embodiment the absorptive rate is between 0.10 g/second/cm$^2$ and 0.18 g/second/cm$^2$ for water. In a more preferred embodiment the absorption rate of the absorptive material is between 0.12 g/second/cm$^2$ to 0.15 g/second/cm$^2$ for water.

The absorptive rate/capacity relates to how fast the present absorptive article can absorb a liquid, such as water in one minute compared to the absorptive article's maximum rate/capacity.

In one aspect of the invention the maximal absorption capacity of water of the absorptive particles when present in loose weight is reached in 3.5 to 6 seconds, such as 4.5 to 5.5 seconds.

In the present context the term "water" refers to tap water.

In a preferred embodiment of the invention the article comprises a non-woven material with a super absorptive material, wherein the article is capable of absorbing 40% of its maximal capacity of water in approximately 1 minute. In a more preferred embodiment of the invention the absorptive material of the article has an acquisition layer, which may receive and spread the incoming liquid, such as water and thereby increasing the absorption speed. The acquisition layer ensures passage of the incoming liquid into the article without the liquid spilling over. As described in the examples below when water is used on a material having a acquisition layer the absorption rate of the material is approximately 85% of its maximal capacity in 1 minute.

In one embodiment of the invention the article comprises an absorptive core, of for example Vizorb 3907 from Buckeye and a substantially non-liquid permeable outer layer material. The latter material may be a polyethylene material in the shape of a bag. The absorptive core of the article may be fastened at least in one place to the outer packaging layer or it may be loosely placed inside the outer packaging layer.

According to the invention a volume space between the outer packaging layer and the absorptive core may be necessary to allow the absorptive core to expand when brought into contact with a liquid. Another very important function of the available volume space between the outer packaging layer and the enclosed absorptive core of this particular embodiment is the possibility of a liquid being overdosed as long as the overdosed liquid may be contained in the volume space of the article. Liquid, which is not immediately absorbed by the absorptive material, may in this way be absorbed over time without leaking from the article. This is a strong feature of the present article embodiment. For example an article without the mentioned feature having an absorptive speed of 5 L/min and a maximal capacity of 15 L will not initially be capable of handling a liquid dose of 7 L/min. even though this amount is far less than the maximal capacity of the article. However, the present invention is capable of overcoming this problem due to the collection of excess liquid inside the article followed by the absorption of the liquid by the absorptive material.

Accordingly, the material of the article of the invention has in a preferred embodiment an absorption capacity for water of at least 0.5 g/cm$^2$, such as at least 1.0 g/cm$^2$, for example at least 1.50 g/cm$^2$, such as at least 2.0 g/cm$^2$, for example at least 4.0 g/cm$^2$, such as at least 6.0 g/cm$^2$, for example at least 8.0 g/cm$^2$, such as at least 10 g/cm$^2$.

In a more preferred embodiment of the invention the absorption capacity is between 3.5 and 5.0 g/cm$^2$, such as between 4.0 and 4.5 g/cm$^2$.

In a further embodiment the absorptive material of the article has an absorption capacity for water of at least 10 g. of water/g. of material, such as at least 30 g. of water/g. of material, for example at least 50 g. of water/g. of material, such as at least 70 g. of water/g. of material, for example at least 90 g. of water/g. of material, such as at least 110 g. of water/g. of material, for example at least 130 g. of water/g. of material.

In a preferred embodiment the absorptive material of the article has an absorption capacity for water of between 45 and 60 g. of water/g. of material, such as between 50 and 55 g. of water/g. of material.

In yet a further embodiment the absorptive particles of the present article when in loose weight has an absorption capacity of up to 200 g. water/g. of loose weight particles or an absorption capacity of up to 500 g. of distilled water/g. of loose weight particles.

Wet Burst Strength

According to the present invention the burst strength of the absorptive material is very low. It is important that the absorptive material of the article is solid enough to be maintained inside the outer packaging layer. In other words, the absorptive material must be in such a physical form that it may not leak from the outer packaging layer. In one embodiment of the invention the wet burst strength value of the present absorptive material may be within the interval of between 350 g/cm$^2$ and 1700 g/cm$^2$, such as between 550 g/cm$^2$ and 1500 g/cm$^2$, for example between 750g/cm$^2$ and 1300 g/cm$^2$, such as between 950 g/cm$^2$ and 1100 g/cm$^2$. In another embodiment the wet burst strength is as low as possible to secure the possibility of easy removal of the article after absorption when the article has expanded.

Expansion

In yet a further embodiment of the invention The article according to any of the preceding claims, wherein the absorptive material of the article has an expansion factor of at least 4 when absorbing a liquid.

According to one embodiment of the invention the absorptive material, of the article may only expand substantially in height and substantially not in length and/or width. This is due to the construction of this embodiment of the article wherein there is little physical space to accommodate an length/width wise expansion.

Non Water-Based

Another aspect of the invention concerns the absorptive material of the article being capable of absorbing a non-water based liquid.

According to the invention the liquid may be selected from oil, emulsions, or chemicals.

For the particular purpose of absorbing a non-water based liquid the absorptive material may comprise moler. Moler comprises approximately 30% clay particles and 70% fossilised diatoms. The absorptive material is often porous whereby the non water-based liquid is absorbed through capillary forces.

In one embodiment of the invention the absorptive material comprises porous clay, such as burned moler.

In another embodiment of the invention the absorptive material comprises carbon black.

In a further embodiment of the invention the absorptive material comprises a combination of moler and carbon black. The combination may in one embodiment be present in a ratio of 70% by weight of moler and 30% by weight of carbon black, such as in a ratio of 60% by weight of moler and 40% by weight of carbon black, for example in a ratio of 50% by weight of moler and 50% by weight of carbon black.

In yet a further embodiment the absorptive material comprises a combination of moler and carbon black and absorptive polymer(s) or hydrogel(s). In one embodiment of the invention the combination may be present in a ratio of 70% by weight of moler and 25% by weight of carbon black and 5% by weight of a polymer or a hydrogel, such as in a ratio of 60% by weight of moler and 30% by weight of carbon black and 10% by weight of a polymer or a hydrogel, for example in a ratio of 50% by weight of moler and 35% by weight of carbon black and 15% by weight of a polymer or a hydrogel.

In another embodiment the absorptive material comprises a combination of carbon black and absorptive polymer(s) or hydrogel(s). In one embodiment of the invention the combination may be present in a ratio of 70% by weight of moler and 30% by weight of a polymer or a hydrogel, such as in a ratio of 60% by weight of moler and 40% by weight of a polymer or a hydrogel, for example in a ratio of 50% by weight of moler and 50% by weight of a polymer or a hydrogel.

In yet another embodiment the absorptive material comprises a combination of carbon black and absorptive polymer(s) or hydrogel(s). In one embodiment of the invention the combination may be present in a ratio of 70% by weight of carbon black and 30% by weight of a polymer or a hydrogel, for example in a ratio of 60% by weight of carbon black and 40% by weight of a polymer or a hydrogel, such as in a ratio of 50% by weight of carbon black and 50% by weight of a polymer or a hydrogel.

Flexibility

In another aspect of the invention the absorptive material of the article may be flexible. In one embodiment the present article is flexible enough to be adjusted to the purpose of the use of the article. For example, the article may be used in places which are difficult to physically reach, such as between pipes, on a machine or other places where the bending and shaping of the present article is necessary.

Attachment

In one aspect of the invention the outer packaging surface of the article may be surrounding the absorptive material attached on more than one side. The outer material may be one uninterrupted piece of material, or the outer material may comprise at least two pieces of material connected to each other. In the latter embodiment the at least one side of the outer packaging surface is connected to at least one other side of the outer packaging surface through welding.

In a further embodiment the at least one side of the outer packaging surface is connected to at least one other side of the outer packaging surface through glue tape. In yet a further embodiment the at least one side of the outer packaging surface is connected to at least two outer packaging layers being connected at least at a part of their outer periphery by means of a seam, wherein the seam for example may be formed with glue or welded, or any other means of forming a seam.

According to the present invention it is envisioned that the absorptive material may be in loose contact with the outer packaging layer, such that no physical attachment between the absorptive material and the outer packaging layer is provided for. However, depending on the purpose of the present article it may prove beneficial to attach the absorptive material to at least one side of the outer packaging surface.

In one embodiment upon expansion of the absorptive material the present article may be changing its physical shape into a substantially box shaped article. In another embodiment the article may be changing into a substantially oval shape. In further embodiment the article may be changing into a variety of shapes depending on the purpose of the use of the article.

Method of Producing

It is also within the scope of the invention to provide for the production of the present article and the use of such a production method for the manufacture of the present article. In one embodiment of the invention the absorptive material may be prefabricated and presented as rolls of material. From these rolls of material the absorptive core of the present article may be cut or punched into the preferred size followed by the packaging of the absorptive material in an outer layer, such as flow packing or blister packing. In one embodiment the above production is performed as a continuous process, such as an in-line production providing for an effective and high-speed production. In another embodiment the production is discontinuous and is performed fully or partly manually, which provides for a low cost production.

Use of Article

The article described by the present invention has numerous application possibilities. One such application may be for the use in the plumbing business. Very often plumbers perform work on pipes, such as water pipes. When handling a filled water pipe for example water will be released to the surroundings from said pipe. It is of course possible to provide for other absorbent materials, or containers to collect the water spilled from the pipe in need of repair. However, situations may occur where there is a limited space adjacent to the pipe and therefore a container, typically a bucket may prove insufficient as a liquid collecting means. Further, it is very important that the plumber is capable of cleaning up after performing the job and thereby leaving the surroundings as tidy as possible, this is especially true when working in people's private homes. The present article has solved the problem of having an absorptive article at hand and has at the same time made it possible to discard the absorptive article without leaving any traces. It is the intention that the present article may be part of a plumber's kit when working.

In yet another embodiment of the invention the article is used as a drip absorbent. Similar to the above application the article may be placed adjacent to embodiments where from liquid is dripping. Such an embodiment may be holding chemicals or oil. For example it is envisioned that the present article may be used on board ships in the engine rooms or in engine rooms in general, in chemical plants, in auto garages, in the manufacture, testing and reparation process of hydraulic systems, and in the metal manufacturing/preparatory industry.

The present article may also be applied as a residual liquid absorbent. It is often very difficult to empty for example a container of its residual liquid. The present article is excellent at removing residual liquids when placed in contact with such a liquid. It is envisioned that the present article after having been brought in contact with the residual liquid is removed and disposed of without any liquid leaking from the article. The latter is a general concept valid for all the applications of the present invention.

The formation of condensate water is a major problem within all areas of production industry, wherein condensate water is not allowed to get in contact with the product. This is the case within the production of for example paper, articles of food, pharmaceuticals and medical devices. In the first case the condensate water may destroy the paper, and in the other cases the condensate water may destroy the products by contamination. Accordingly, the present invention may be used as a condensate absorbent, especially in connection with machines, which are cooled.

In a further embodiment the present article may be sterile.

In another aspect of the invention the present article is used to substitute a pump by the capability of the article to absorb liquid from a container or a blocked pipe for example. The present article may be used in situations where there is a lack of space to fit a pump, or if unwanted objects exists in the liquid, which could cause blocking or damage of a pump, or if the liquid itself, such as acids or organic compounds would damage the pump.

Definitions

Liquid: can be non-water based and water based

Non-liquid permeable layer: equals not liquid permeable layer

Absorption speed is defined as the time it takes a predefined volume of water to be absorbed by the material. The absorption speed depends upon the surface area of the absorptive material. This means that in the case of a particle type comprising water absorptive materials having a constant mass, the absorption speed of the material becomes slower as the relationship between the surface area of the particle and the volume of the particle becomes smaller and thus the distance of diffusion of water to the inner core of the particle becomes longer, and hence it takes a longer time for the water to reach the inside of the particle. Further, an additional contribution to the slow absorption speed is due to the driving force on the water being diminished as the amount of water bound to the particle increases. Conversely, the absorption speed becomes faster as the particle size becomes smaller because the contact surface area increases accordingly. However, if the particle size is too small, a phenomenon happens in which particles of the water absorptive material cohere with each other via water (a phenomenon called "undissolved lumping") upon contact with water. Thus, the apparent absorption speed becomes slower. As a result, the liquid take-up rate is low which requires a longer residence time of the absorptive material in the spill in order to reach the saturation level. This drawback is particularly significant for applications where the absorptive material is subjected in use to vigorous movements by natural forces, such as sea waves or wind, having a tendency to separate the absorbent pad from the spill. In such applications a high fluid take-up rate is desirable to allow an efficient utilisation of the available absorptive material.

Absorptive rate: the amount of liquid in weight volume capable of being absorbed by a given material per area and per time unit, such as g/cm²×s. It may also be defined as the amount of liquid capable of being absorbed in 1. min. compared to the total capacity of the material.

Capacity: the amount of liquid a material can absorb per surface area. By surface area is meant the area of one side of the article, and not the total surface area of the material, which may also comprise more than one side (unit: g/cm²). For example a sample of 5×5 cm has a surface area of 25 cm².

Wet burst strength: is the tensile strength of the absorptive material when wet (unit: weight per areal).

Super absorptive material: are capable of binding considerable amounts of liquid, such as water either by absorbing the liquid or by making the liquid gelenize. Such material is typically in the form of particles or fibres, wherein some are capable of binding liquid in an amount surpassing the weight of the material by hundred folds.

EXAMPLES

The following examples are intended as non-limiting illustrations of the present invention.

Example 1

Absorption and retention of the materials used are determined in the following way. A 5×5 cm sample of the material is stamped out. The sample is weighed and placed in a Petri dish for 5 min. together with the liquid of which it is desired to determine the value. The sample is then removed from the liquid and the absorption is determined gravimetrically.
Retention of Absorbing Non-Woven Material The retention is determined by placing a weight of 1.35 kg on top of the fully absorbed sample corresponding to a pressure of 40 mm Hg. The weight is removed after 1 min. and the sample is weighed again for determining the amount of liquid being retained in the sample.

The result for the material Vizorb 3907 from Buckeye nonwovens (3 mm thickness, 2 layers) tested on tap water.
Absorption: 5.4 g/cm²
Retention: 4.0 g/cm²
Absorption Rate of Absorbent Non-Woven Material The absorption rate is determined in 2 ways.

The initial absorption rate is determined by dropping a drop of the liquid used for the the test onto the surface of the material where after the time of absorption of the drop into the material is measured.

The absorption capacity of 1 min. is also a measure of the absorption rate which is determined by weighing a 5×5 cm sample and placing it into a Petri dish to which the liquid to be tested is added over 5 seconds. The material is left in the dish for 1 min. The sample is taken up and the amount of liquid absorbed is determined gravimetrically.

Result for the material Vizorb 3907 from Buckeye non-woven (3 mm thickness, 2 layers) tested on tap water.
Initial absorption: 1-3 seconds.
Absorption within 1 min.: 2.2 g/cm² corresponding to >40% of the max. absorption capacity of the material.

By placing an acquisition and spread layer on top of the absorbent core an absorption of >80% of the max. absorption can be achieved within said 1 min. as well as an initial absorption within 1 sec.
Determination of the Absorption Capacity of the End Product:

A horseshoe-shaped cut is made in the casing on one side of the product approximately 5 cm from the edge of the absorbent core, whereby a flap is formed which subsequently may be turned back for closing the aperture when the product is to be discarded. The product is weighed.

Liquid is added at a rate being sufficiently low to avoid that the liquid overflows the brim of the casing. As much liquid as possible is added within 5 minutes. A hole is thereafter pricked at the bottom of the casing of the product and the non-absorbed amount of liquid is drained off. The absorbed amount of liquid is then determined gravimetrically and a measure of the maximum capacity of the product is obtained. Result for the material Vizorb 3907 from Buckeye non-woven (3 mm thickness, 2 layers) tested on tap water. Product size 50×80 cm with a core of 46×76 cm.
Absorption: 18.5 kg/product.

The invention claimed is:

1. A disposable article for absorbing a liquid, wherein the article consists of
   (a) an outer packaging surface formed from two layers of liquid impermeable material connected to each other, and optionally fabricated from one uninterrupted piece of material that is folded to form the two layers, said layers defining one compartment between said two layers, said outer packaging surface including (1) an opening or (2) a demarcated lid area, and
   (b) an absorptive material capable of expanding as a result of absorption of liquid positioned in said compartment, wherein the outer packaging surface surrounds more than one side of the absorptive material, wherein liquid can pass through said opening (i) into the absorptive material, wherein said demarcated lid area (ii) is so formed as to be readily openable prior to use of the article, so as to provide an opening through which liquid can pass into the absorptive material, and
   (c) optionally, if said opening (i) is present in said outer packaging surface, a liquid impermeable lid which covers or can cover said opening, and thereby protects said absorptive material from liquid, prior to use, and which lid is openable, so liquid can enter such opening, when the device is to be used to absorb liquid,
   wherein said outer packaging surface is formed as to provide, at least when said absorptive material is unexpanded, a volume space located between said absorptive material and said outer packaging surface such that liquid, which enters the opening (i) or opened demarcated lid area (ii), may be collected in said volume space, and absorbed over time by said absorptive material, without leaking from the article,
   said article being capable of changing its physical shape as a result of expansion of the absorptive material such that the article increases in at least one physical dimension.

2. The article according to claim 1, wherein the liquid is non water based.

3. The article according to claim 2, wherein the liquid is selected from oil, emulsions, or chemicals.

4. The article according to claim 1, wherein the absorptive material comprises moler and/or carbon black.

5. The article according to claim 1, wherein the liquid is water based.

6. The article according to claim 1, wherein the outer packaging surface is fabricated from one uninterrupted piece of material that is folded to form said two layers.

7. The article according to claim 1, wherein the absorption rate of the absorptive material (2) is between 0.04 g/second/cm² to 0.30 g/second/cm² for water.

8. The article according to claim 1, wherein the absorption rate of the absorptive material is between 0.12 g/second/cm² to 0.15 g/second/cm² for water.

9. The article according to claim 1, wherein the absorption speed of the absorptive material for 0.05-0.1 ml of water is less than 30 seconds.

10. The article according to claim 1, wherein the absorptive material of the article has an absorption capacity for water of at least 2.0 g/cm$^2$.

11. The article according to claim 1, wherein the absorptive material of the article has an absorption capacity for water of at least 10 g. of water/g. of material.

12. The article according to claim 1, wherein the absorptive material of the article has an expansion factor of at least 4 when absorbing a liquid.

13. The article according to claim 12, wherein the absorptive material of the article is expanding substantially in height, and substantially not in length and/or width.

14. The article according to claim 1, wherein the absorptive material of the article is made from at least one non woven material.

15. The article according to claim 1, wherein the absorptive material of the article comprises polymethacrylicamide, polyacrylicacid, polymethacrylicacid, polyacrylicamide, polyvinylpyrrolidone or derivatives thereof.

16. The article according to claim 1, wherein the absorptive material of the article comprises carboxymethylcellulose or hydroxyethylcellulose or alginate starches or derivatives thereof.

17. The article according to claim 1, wherein the absorptive material of the article comprises hydrophilic polyurethane foam.

18. The article according to claim 1, wherein the absorptive material of the article comprises polyacrylicacid or salts thereof.

19. The article according to claim 1, wherein at least one side of the outer packaging surface is connected to at least one other side of the outer packaging surface through welding.

20. The article according to claim 1, wherein at least one side of the outer packaging surface is connected to at least one other side of the outer packaging surface through glue tape.

21. The article according to claim 1, wherein the absorptive material is attached to at least one side of the outer packaging surface.

22. The article according to claim 1, wherein the absorbent material is free from attachment to at least one side of the outer packaging surface.

23. A method for absorbing a liquid which comprises
(1) providing the article of claim 1,
(2) opening the lid area or removing the lid so as to create or expose an opening in said article, and
(3) permitting the liquid to come in contact, through said opening, with the absorptive material.

24. The method of claim 23 in which the liquid is a drip, residual liquid, condensate, leak, splash or spill.

25. The method of claim 23 in which the liquid is from a pipe.

26. A method for producing an article as defined in claim 1 comprising
establishing a liquid impermeable outer layer material,
cutting or punching preferred sizes of an absorptive material,
packing the cut or punched absorptive material in the liquid impermeable outer layer material so that said liquid impermeable outer layer material surrounds more than one side of said absorptive material, and so that a volume space is formed between the outer packaging surface and at least two sides of the absorbent material and
providing the liquid impermeable outer layer material with a demarcated lid area or with an opening, and in the latter case, providing a liquid impermeable lid,
wherein said lid area or opening may be formed before, during or after said packing.

27. The article of claim 1, wherein the article has a top surface, the opening or demarcated lid area being disposed in the top surface, the horizontal cross-sectional area of the absorptive material is substantially less than the horizontal cross-sectional area of the top surface, thereby creating a substantial volume space disposed between the outer packaging surface and a side of the absorptive material other than the side beneath' the top surface of the article.

28. The article of claim 1, wherein the volume space has a thickness of at least 2 cm between the absorbing material and the outer packaging surface.

29. The article of claim 1, wherein the volume space is at least about 12.6% of the volume of the absorbing material prior to absorption of fluid.

30. The article of claim 1, wherein said volume space is at least 40% of the volume of fluid which said absorptive material can absorb within the first minute of contact with the fluid.

31. The article of claim 1, wherein said absorptive material has a maximal absorptive capacity and said volume space is at least 15% of the maximal absorptive capacity of said absorptive material.

32. The article of claim 1, wherein said absorptive material has a maximal absorptive capacity and said volume space is at least 60% of the maximal absorptive capacity of said absorptive material.

33. The article of claim 1, wherein the article has a top surface, the opening or demarcated lid area being disposed in the top surface, and a bottom surface, wherein as a result of expansion of the absorptive material, the article is capable of increasing in height without increasing in width or breadth.

34. The article of claim 33, wherein as a result of expansion of the absorptive material, the article is capable of increasing in height while decreasing in width and/or breadth.

35. The article of claim 1, said article having at least folding side joining said top surface to said bottom surface, said folding sides being in a bent configuration prior to absorption of liquid by the article, and as a result of absorption of liquid, the top and/or bottom sides are moved, increasing the height of the article, and the folding sides thereupon adopt a less bent configuration, decreasing the width or breadth of the article.

36. The article of claim 1, the volume space being so dimensioned so as to accommodate a substantial expansion of said absorptive material into said volume space.

37. The article of claim 1, said outer packaging surface being flexible.

* * * * *